United States Patent [19]
Bavis

[11] Patent Number: 5,113,970
[45] Date of Patent: May 19, 1992

[54] FOOD SERVICE SYSTEM FOR DRIVE-IN RESTAURANTS

[76] Inventor: Edward F. Bavis, 201 Grandin Rd., Maineville, Ohio 45039

[21] Appl. No.: 794,388

[22] Filed: Nov. 19, 1991

Related U.S. Application Data

[63] Continuation of Ser. No. 80,494, Jul. 31, 1987, abandoned.

[51] Int. Cl.⁵ .................................................. E04H 3/02
[52] U.S. Cl. ........................................ 186/41; 186/50; 198/468.6; 198/797
[58] Field of Search ..................... 186/35, 36, 37, 39, 186/40, 41, 50, 51, 52, 53; 198/797, 750, 346.2, 468.6, 468.8; 226/76

[56] References Cited

U.S. PATENT DOCUMENTS

| | | | |
|---|---|---|---|
| 472,212 | 4/1892 | Fralinger | 198/797 X |
| 1,096,509 | 5/1914 | Kern | 198/797 X |
| 2,638,636 | 5/1953 | Pool | 186/53 X |
| 2,904,131 | 9/1959 | Bailey | 186/37 X |
| 3,237,933 | 3/1966 | Grosswiller et al. | 186/37 X |
| 4,010,824 | 3/1977 | Bavis | 186/37 |
| 4,311,211 | 1/1982 | Benjamin et al. | 186/53 |
| 4,520,684 | 6/1985 | Meyer et al. | 226/76 X |
| 4,624,359 | 11/1986 | Gross | 198/468.6 X |
| 4,638,312 | 1/1987 | Quinn et al. | 186/53 X |
| 4,645,035 | 2/1987 | Bavis | 186/37 |
| 4,712,650 | 12/1987 | Campbell | 186/41 |

Primary Examiner—F. J. Bartuska
Attorney, Agent, or Firm—Frost & Jacobs

[57] ABSTRACT

An integrated system for delivering food and other products from a central processing station to one or more remote delivery stations, the products being transported in carriers which travel both vertically and horizontally in an upright position on conveyors having reversible paths of travel which include optional delivery positions. The system is expandable to include order stations in advance of the delivery stations from which orders are sent to the central processing station, the order stations optionally including currency conveyors in communication with the central processing station to permit payment for the items purchased at the time they are ordered.

17 Claims, 8 Drawing Sheets

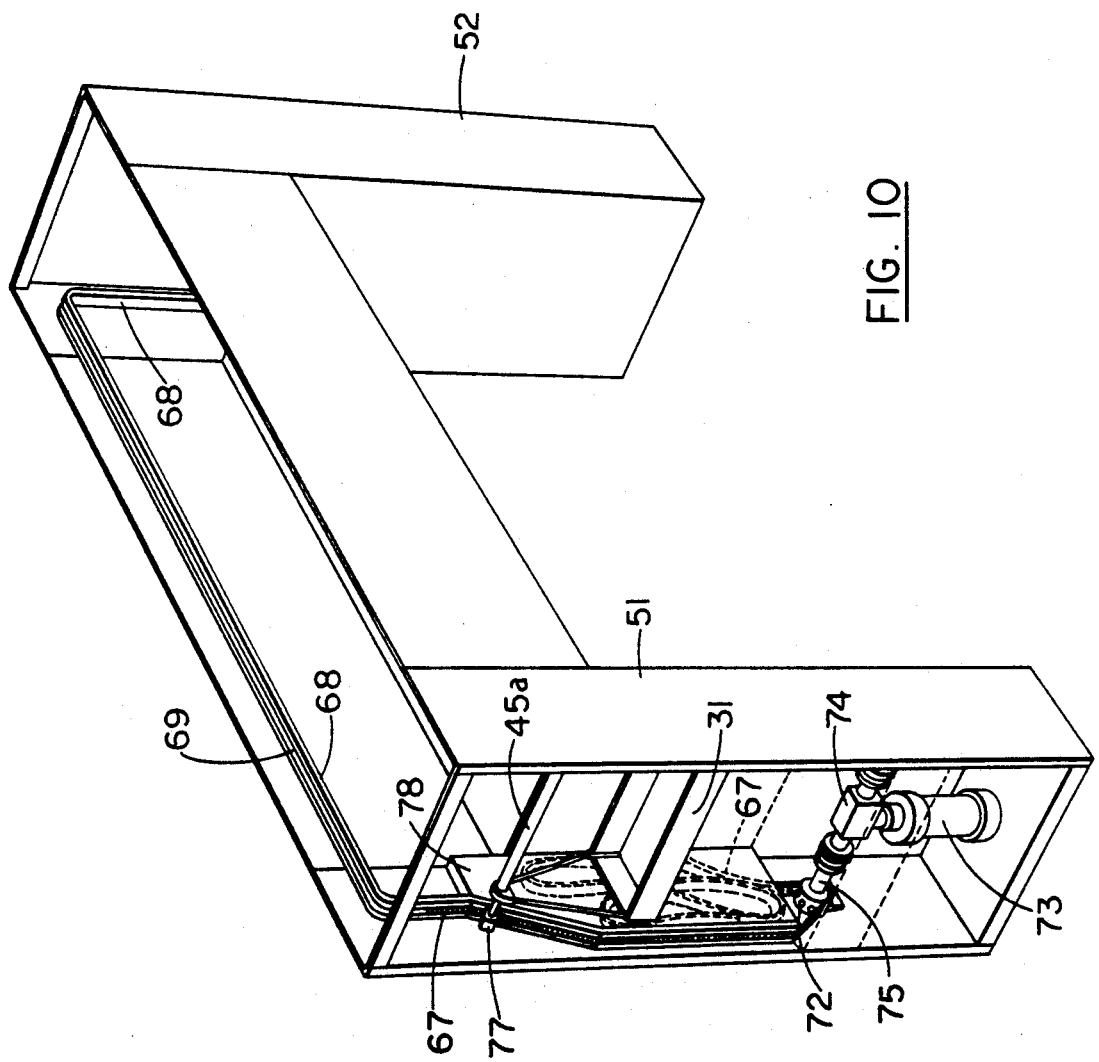

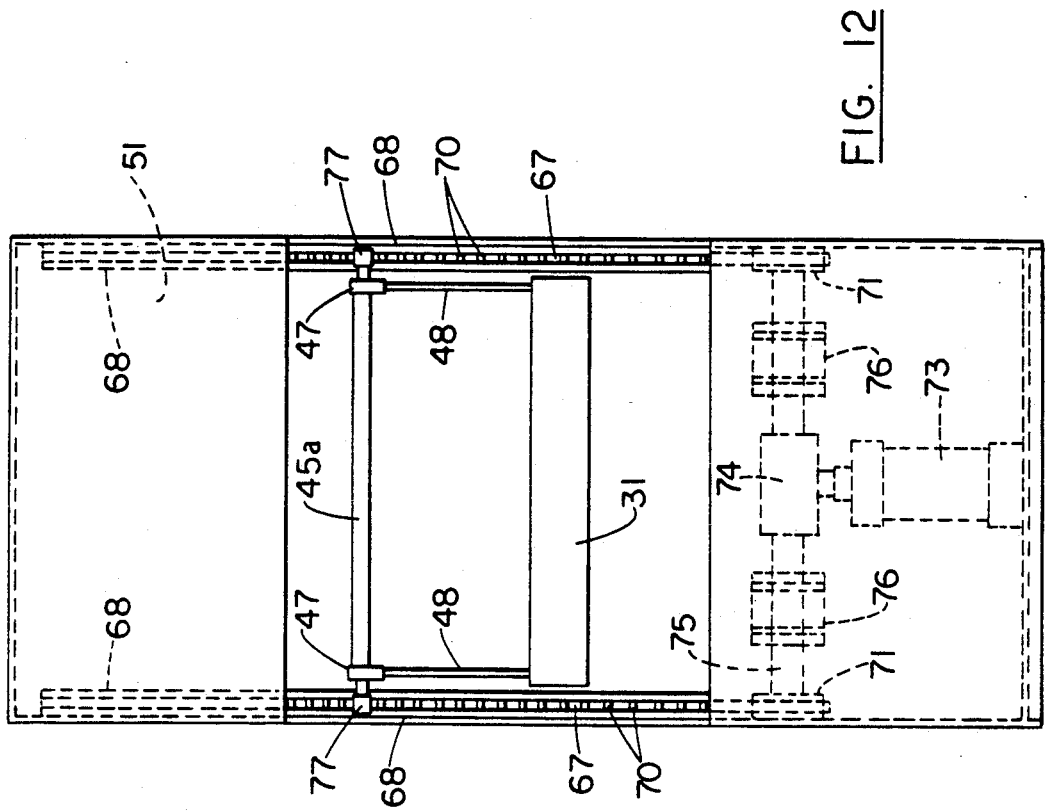
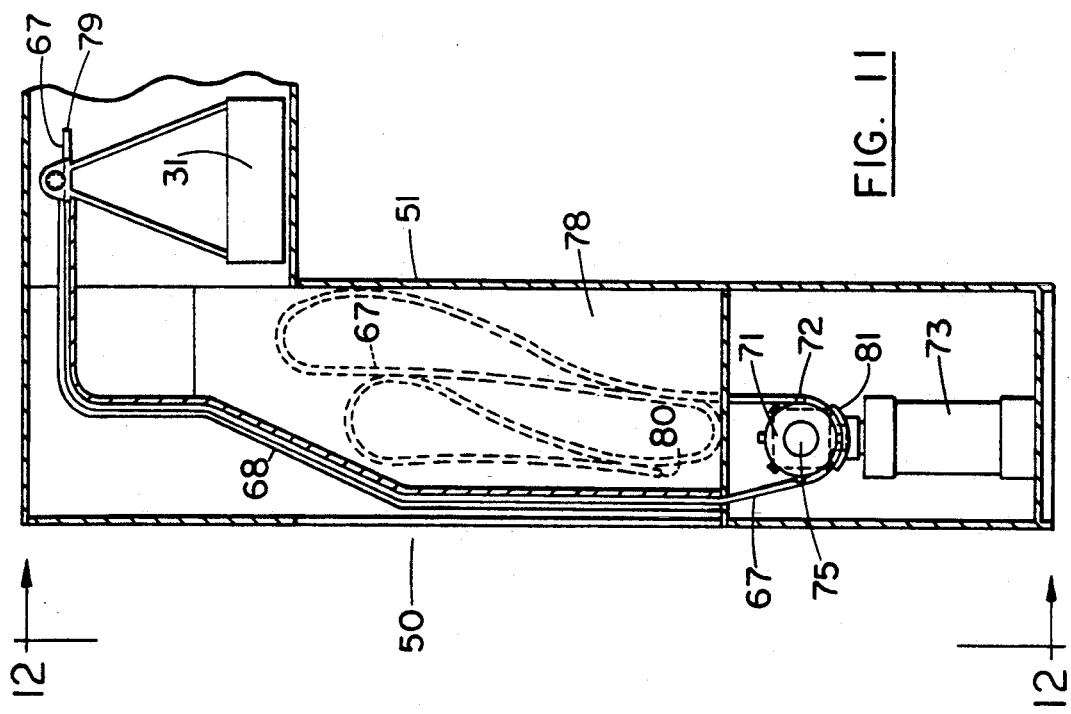

FOOD SERVICE SYSTEM FOR DRIVE-IN RESTAURANTS

This is a continuation of application Ser. No. 07/080,494, filed Jul. 31, 1987, now abandoned.

This invention relates to conveyor systems and more particularly to a food service system for use in drive-in restaurants and similar drive-in service facilities where orders are taken and items dispensed to the customer

BACKGROUND OF THE INVENTION

Conveyor systems have hitherto been utilized in drive-in banks to convey a deposit box or similar receptacle from a remote customer station to a teller station and return. Both pneumatic and belt-type conveyor systems have been utilized for this purpose, although the trend has been toward belt-type systems which are less expensive and easier to install and maintain. The belt-systems also lend themselves for uses in any application wherein it is desired to transport objects from one location to another. Examples of belt-type conveyor systems may be found in U.S. Pat. Nos. 4,010,824 and 4,645,035.

While conveyor systems of the types described above have materially enhanced the efficiency of drive-in banking facilities in that two, three or even more stations may be provided to accommodate the demand, it has now been recognized that similar principles of multiple station drive-in facilities can be applied to fast food operations and other similar drive-in facilities. In a conventional drive-in or drive-through restaurant facility, for example, an order station is provided in advance of the food dispensing station. The order station normally contains a menu board and a two-way communication system by means of which the customer's order may be given to an order clerk, whereupon the customer proceeds to the dispensing station, which is normally a window located a substantial distance from the order station so that a number of vehicles may be accommodated between the two stations.

The order clerk, upon receiving the customer's order, obtains the requested items from within the restaurant and packages them for delivery to the customer at the order window. Since the filling of an order may take an appreciable amount of time, depending upon the number and character of the items ordered, the procedure is often time consuming and during periods of high density traffic, substantial back-ups and delays can result. This is primarily due to the fact that it is extremely difficult to provide two or more dispensing windows in the building at locations where the motorist can drive up to the window to receive the items directly from an order clerk stationed within the building.

Another major disadvantage of present drive-in food service operations is the fact that the order clerk must also collect payment for the items ordered at the time they are delivered to the customer, which normally entails making change. This adds to the delay in moving customers through the drive-in lane.

In contrast to the foregoing, the present invention provides a system whereby the items being purchased may be delivered to the customer at one or more remote delivery stations so that two, three or even more lanes may be provided, each of which may be serviced from a central order processing station within the restaurant.

SUMMARY OF THE INVENTION

In its basic form, the present invention contemplates the provision of at least one order station at which the customer places the order and then proceeds to one or more delivery stations which are remote from the restaurant building, the items which have been ordered being conveyed from the restaurant building to the remote delivery station by means of a conveyor having a basket-like carrier which transports the items through a housing extending vertically upwardly from the loading station, then horizontally through a canopy overlying the drive-in lanes, and then vertically downwardly through a housing at the delivery station, all while maintaining the items in an upright condition so that beverages will not be spilled or sandwiches overturned. Preferably, the movement of the product conveyor to and from its remote delivery station will be under the control of the order clerk, although provision may be made to permit the customer to effect return of the product carrier to the loading station within the restaurant.

Two or more delivery stations may be provided utilizing a single order station, in which event the order clerk will advise the customer as to which delivery station is to be used. In a more sophisticated version of the system, separate order stations may be provided for each of the delivery stations, thereby further increasing the capacity of the drive-through system.

Another feature of the present invention is the utilization of a conveyor system at the order station which enables the customer to pay at the time the order is given rather than at the time of delivery. To this end, each of the order stations may be provided with a conveyor system having a receptacle or delivery box to deliver payment from the order station to the order clerk, who can then return change and/or a receipt to the customer before the customer leaves the order station. Such arrangement further facilitates the speed in which customers are moved in that preparation of the customer's order can be initiated during the interval in which payment is being made, thereby reducing the wait time at the delivery station. This arrangement also insures proper payment prior to the time the order is delivered to the customer. Preferably, the conveyor systems at the order stations will comprise the belt-type conveyors and delivery boxes disclosed in the aforementioned U.S. Pat. Nos. 4,010,824 and 4,645,035 due to their simplicity and relatively low cost, although other types of conveyor systems may be used for this purpose.

The systems of the present invention also lend themselves to the computerization of the ordering process in that, instead of placing a verbal order with the order clerk, the order station can include a computerized keyboard by means of which the customer may order items listed on the menu board by pressing buttons or touch panels which will register at the processing station within the restaurant either by visual display or by a printout, which can be in the form of a check or receipt. A visual display also can be provided at the order station which will display for the customer the items ordered, their cost, and the total amount to be paid, which amount can then be deposited in the delivery box and delivered to the order clerk who can either return the change and/or a receipt.

In accordance with the invention, the product conveyors preferably comprise a basket-like receptacle or carrier suspended from an opposing set of endless chains or tapes adapted to travel between a loading station forming a part of the central processing station to the remote delivery station, a reversible drive means being provided to drive the chains or tapes in reversible paths of travel. The conveyor mechanism is conveniently housed in hollow columns or housings which preferably will be lined with plastic liners which are easy to clean and maintain. At the loading station within the restaurant, the housing is preferably provided with doors which may be opened and closed to minimize air exchange, and a closure also may be provided at the delivery station which may be closed at times when the drive-in lane is not in operation. Preferably, the rear side of the housing at the dispensing station will have a window so that the order clerk may visually determine when the product carrier has been emptied so that the carrier may be returned to the loading station.

Safety devices can be provided at the delivery station to insure that the conveyor will shut down in the event the customer's hand or arm is caught in the carrier or another obstruction is present which would preclude the free return travel of the carrier.

DESCRIPTION OF THE DRAWINGS

FIG. 10 is a perspective view of a further embodiment of the invention utilizing a tape driven conveyor.

FIG. 11 is a side elevational view illustrating the manner in which the tape may be accumulated in storage pockets lying on opposite sides of the delivery station.

FIG. 12 is a fragmentary side elevational view taken along the line 12—12 of FIG. 11, but with the carrier in dispensing position at the dispensing station.

DESCRIPTION OF THE PREFERRED EMBODIMENTS

Figure 1:
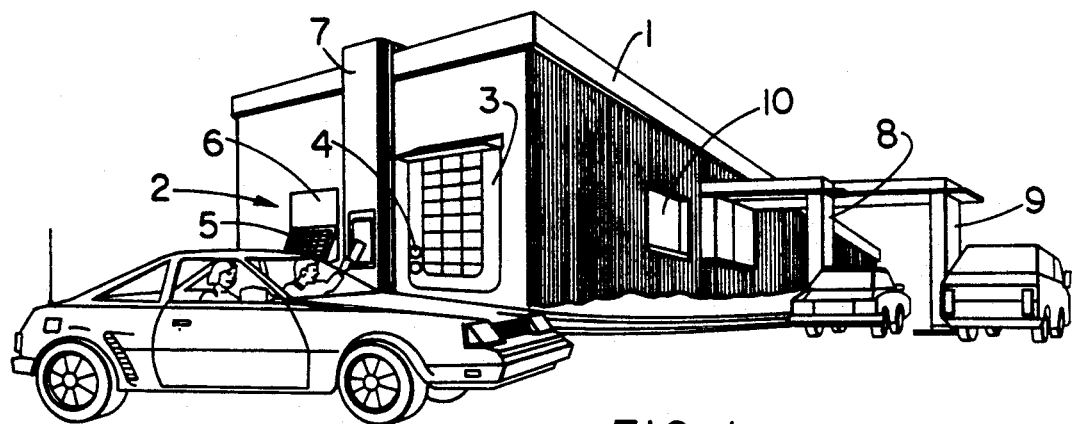
FIG. 1 is a perspective view showing a drive-in restaurant equipped with conveyor systems in accordance with the invention.

Referring first to FIG. 1 of the drawings, which illustrates an exemplary installation of the present invention in a drive-in restaurant, the restaurant building 1 is provided with an order station 2 which may selectively include a menu board 3, a two-way communication system 4, and an order board 5 having keys or touch plates by means of which selected items may be ordered. A video screen 6 may be provided to display items ordered and their cost, and a conveyor 7 is provided by means of which payment may be delivered from the order station to an order processing station located within the restaurant. In the embodiment illustrated two delivery stations 8 and 9 are provided spaced from the order station 2, the delivery stations each incorporating a conveyor system for transporting the items ordered from the order processing station within the restaurant to the delivery station. Preferably, the restaurant building will have an observation window 10 positioned to provide personnel within the restaurant with a clear view of the delivery stations 8 and 9.

Figure 2:
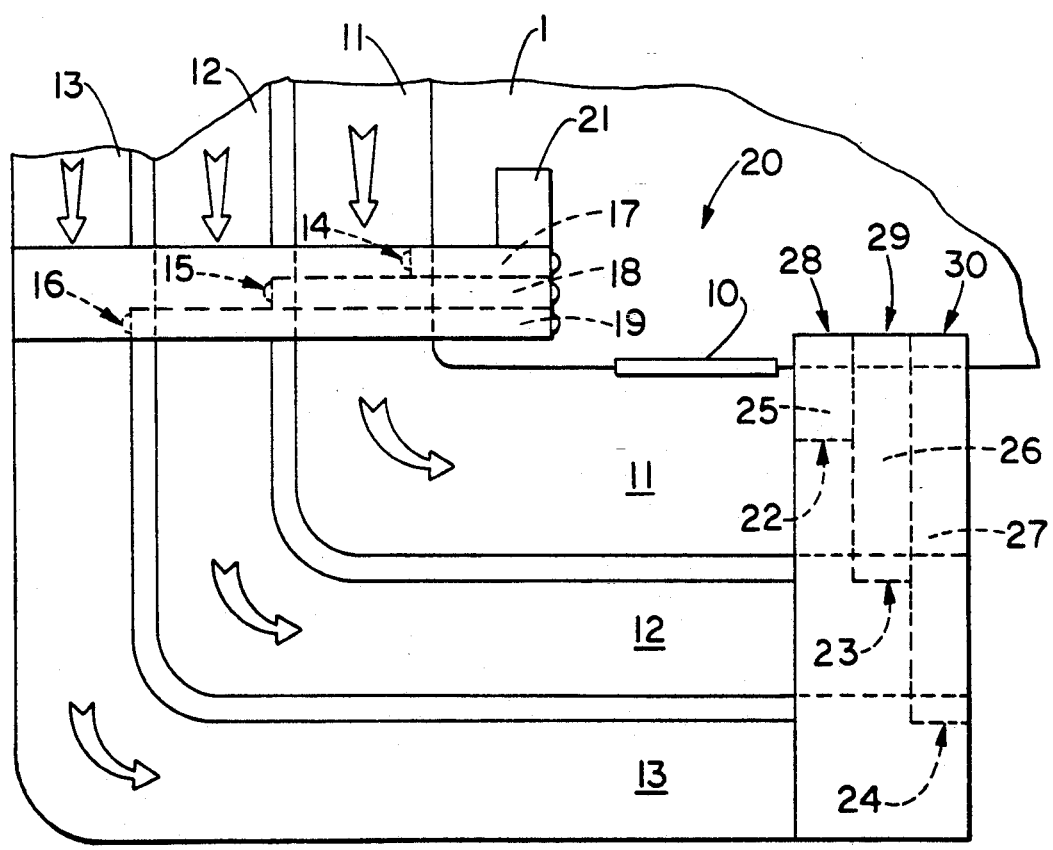
FIG. 2 is an enlarged fragmentary diagrammatic plan view of a drive-in service system utilizing a plurality of order stations incorporating conveyor systems for payment for the items ordered, together with a corresponding series of product delivery conveyors for delivering the orders to the customers at the delivery stations.

FIG. 2 diagrammatically illustrates a multiple-lane drive-in comprising lanes 11, 12 and 13 each having an order station, indicated at 14, 15 and 16, respectively, each of which will be provided with a menu board, a two-way communication system and an order board of the type illustrated in FIG. 1, together with a series of payment conveyors 17, 18 and 19 servicing the respective order stations. Preferably the conveyors 17, 18 and 19 will comprise belt-type conveyor systems such as those disclosed in the aforementioned U.S. Pat. Nos. 4,010,824 and 4,645,035 which act to transport a delivery box from each order station to the central order processing station, indicated generally at 20, located within the restaurant building 1. The central order processing station includes an information center 21 which will monitor each of the order stations 14–16 and effect audio/video communication with the order stations so that one or more order clerks may receive orders from the customers at the order stations for processing, as well as receive payments and return change through the conveyors 17, 18 and 19 if the system incorporates payment conveyors at the order stations.

In the embodiment illustrated in FIG. 2, the vehicle lanes 11, 12 and 13 lead from the order stations 14, 15 and 16 to a series of delivery stations 22, 23 and 24 servicing the respective lanes, the delivery stations having product conveyors 25, 26 and 27, respectively, which extend over the vehicle lanes to the conveyor loading stations 28, 29 and 30 located within and forming a part of the central order processing station 20. In the system illustrated, payments are made at the order stations, although, if desired, the payments can be made at the delivery stations, with the product conveyors 25, 26 and 27 also utilized to convey payments and change between the delivery stations and the loading stations 28, 29 and 30.

Figure 3:
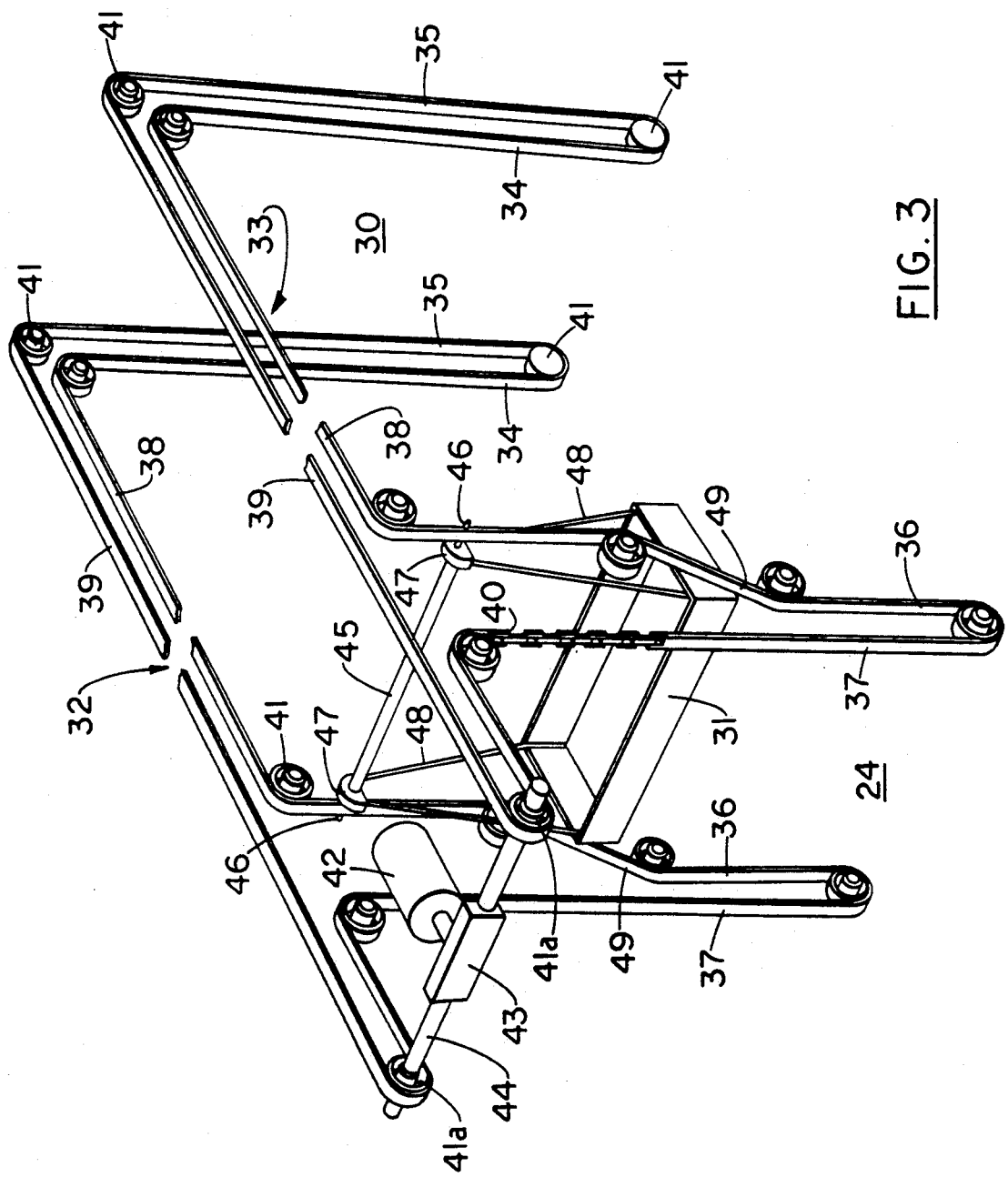
FIG. 3 is a diagrammatic perspective view of a drive mechanism for the product conveyor.

Referring next to FIG. 3, which illustrates the operating components of the product conveyors, a product basket or carrier 31 is mounted on an opposing pair of endless conveyor drive members, indicated generally at 32 and 33, which in the embodiment illustrated will preferably comprise drive chains. Each of the drive members 32, 33 has inner and outer vertical flights 34, 35, respectively, at the conveyor loading station, such as the station 30, and similar inner and outer vertical flights 36 and 37 are provided at the delivery station, indicated at 24, the vertical flights being interconnected by inner and outer horizontal flights 38 and 39, respectively, the lengths of which will vary depending upon the distances between the respective loading stations and the corresponding delivery stations.

In the embodiment illustrated in FIG. 3, the drive members 32 and 33 comprise endless chains, as indicated at 40, passing around sets of guide sprockets 41 which define identical paths of travel for the drive chains. The chains are reversibly driven in synchronism by means of the reversible drive motor 42, gear box 43, and drive shaft 44 having drive sprockets 41a at its opposite ends.

Figure 5:
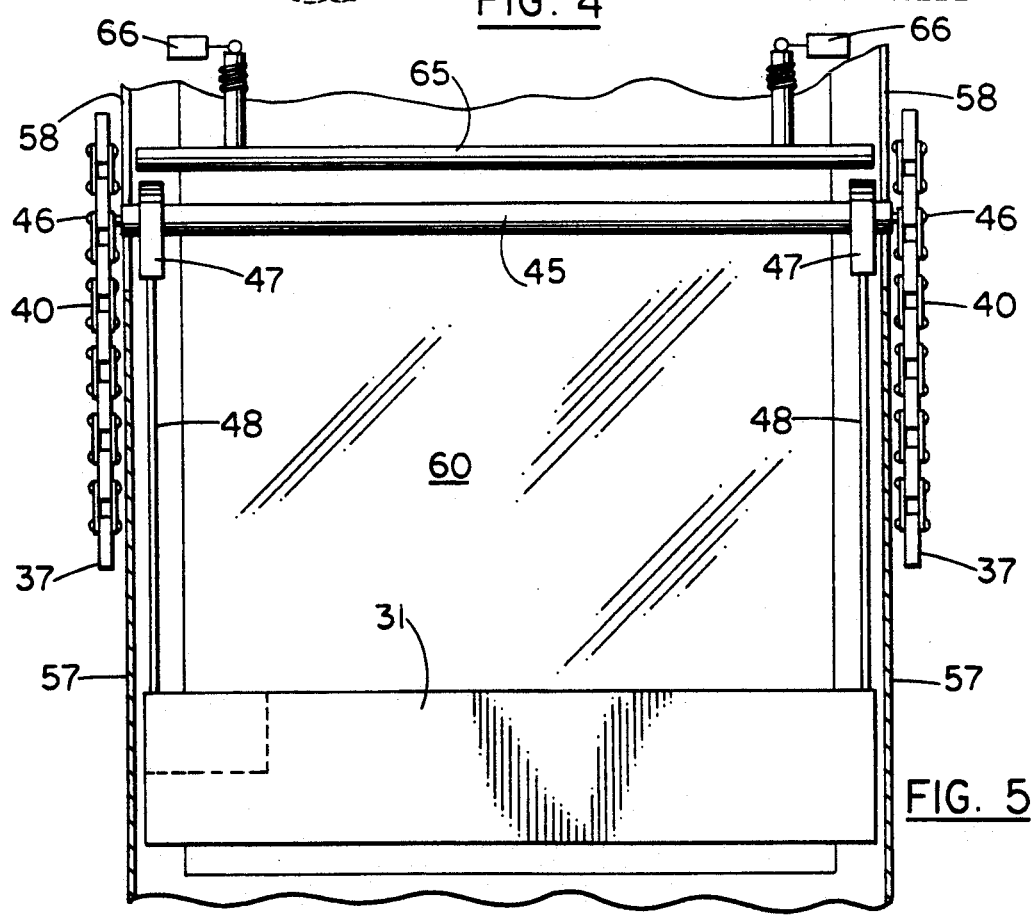
FIG. 5 is an enlarged fragmentary side elevational view taken along the line 5—5 of FIG. 4 illustrating the product carrier, a liner for the housing and a safety mechanism for arresting movement of the carrier in the event of an obstruction.

The product carrier 31 is preferably suspended from a support shaft 45 which is pivotally connected at its opposite ends to the inner flights of the drive members 32 and 33. As best seen in FIG. 5, the shaft 45 is pinned to the links of the chain 40, as by pivot pins 46 which also serve to connect adjoining links on the chains, the product carrier 31 being suspended from the shaft 45 by means of yokes 47 fixed to the shaft and straps or cables 48 fixed to the yokes. With this arrangement, the carrier will remain vertically disposed irrespective of whether it is traveling horizontally or vertically, the shaft 45 rotating relative to the chains 40.

Figure 4:
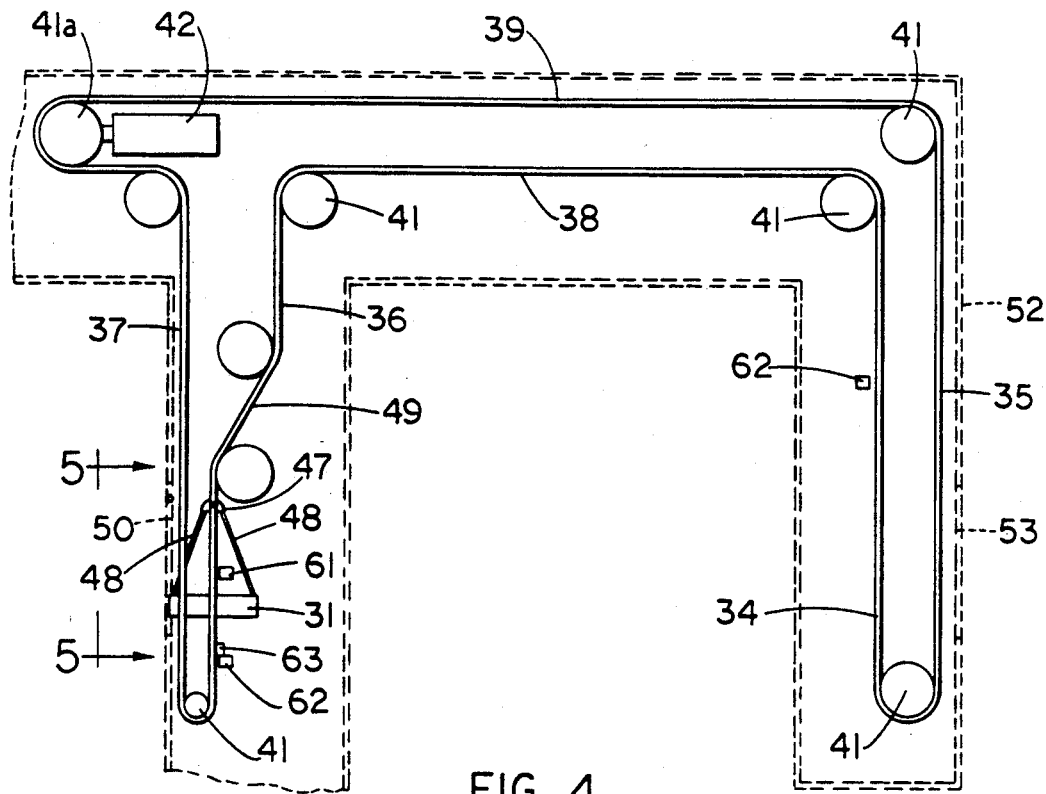
FIG. 4 is a diagrammatic side elevational view of the conveyor system shown in FIG. 3, including the enclosing housings.
Figure 9:
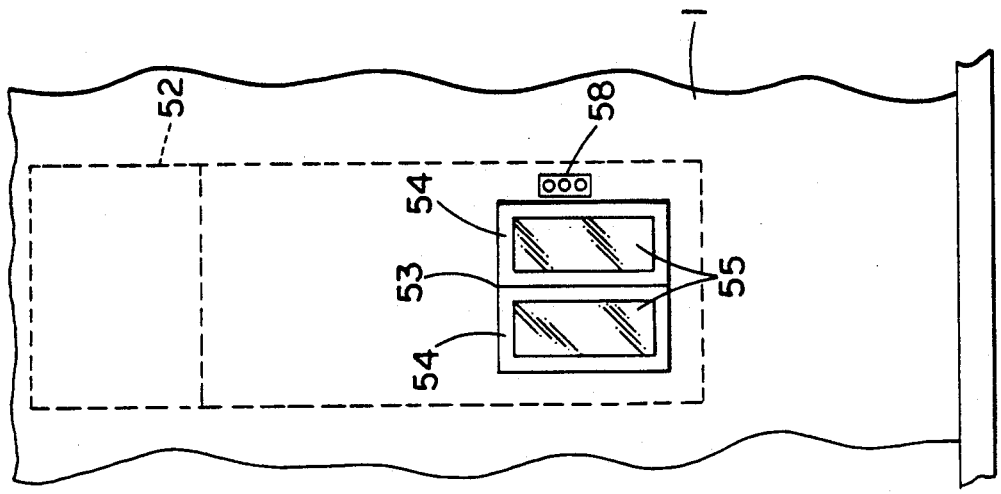
FIG. 9 is a elevational view of the loading station taken along the line 9—9 of FIG. 6.

It will noted in FIGS. 3 and 4 that the inner flights 36 at the delivery station 24 have inclined segments 49 which will act to alter the path of travel of the carrier 31 as it moves vertically at the delivery station. The purpose of these inclined segments is to shift the carrier 31 outwardly as it reaches the delivery station to facilitate removal of the products by the customer, and to this end the inclined segments 49 of the drive members projects the carrier outwardly as it reaches the discharge opening 50 in housing 51 which surrounds and encloses the operating mechanism of the conveyor. A similar housing 52 is provided at the loading station 30, the housing having a loading opening 53 which, as seen in FIG. 9, may be closed by a pair of doors 54 preferably having transparent panels 55. The housings are provided with liners 56, on of which is seen in FIG. 5, which may comprise tubular plastic members having slots 57 in their opposite sides through which the ends of support shaft 45 project, the chains and sprockets being contained between the housings and the liners. The liners are easy to clean and maintain and provide a sanitary environment.

Figure 8:
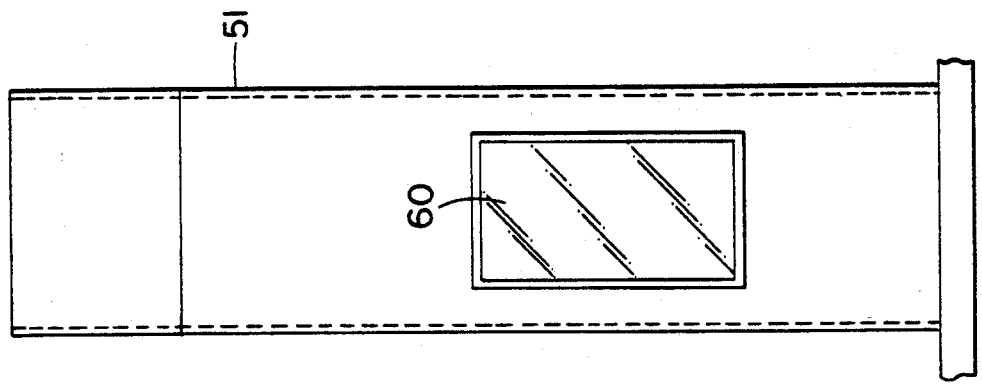
FIG. 8 is a side elevational view taken along the line 8—8 of FIG. 6 showing the viewing window in the rear of the remote delivery station.
Figure 7:
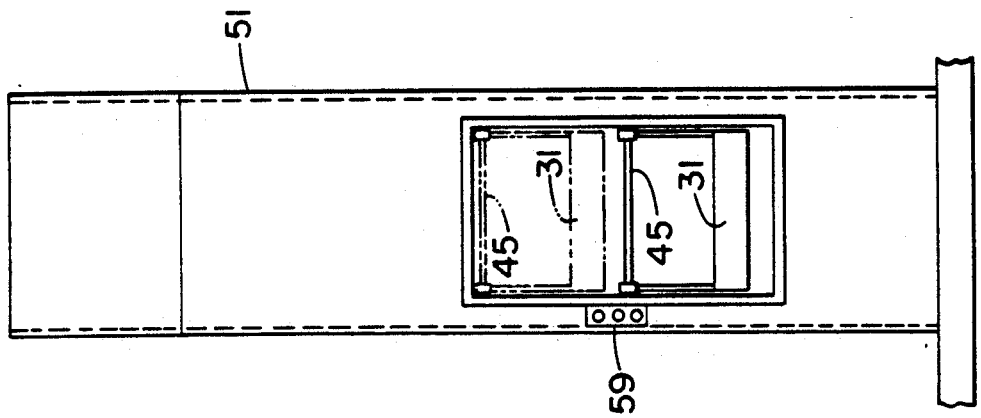
FIG. 7 is a side elevational view taken along the line 7—7 of FIG. 6 illustrating the remote delivery station.

Controls 58 are provided adjacent one of the doors 54 to permit the order clerk to start and stop the conveyor, and such controls will also include a communication system by means of which the order clerk can communicate with the customer at the delivery station. To this end, and as seen in FIG. 7, the delivery station may be provided with a corresponding set of controls 59, although in instances where it is desired to control the operation of the conveyor solely from the loading station, the controls 59 may be limited to a microphone and speaker for communication between the customer and the order clerk. To permit the order clerk to visually determine the status of the carrier when it is at the delivery station, the rear side of the housing 51 may be provided with an observation window 60, as seen in FIG. 8, which will permit visual inspection of the interior of the delivery station from either the window 10 or by means of closed-circuit television monitors.

Preferably, the product carrier will have two positions of use when at the delivery station, a first or lower position, shown in solid lines in FIG. 7, for customers in automobiles, and a second or elevated position, seen in dotted lines, which position will be more conveniently reached by customers in trucks and vans. Suitable stop switches 61 and 62, shown diagrammatically in FIG. 4, acting in conjunction with an actuator 63 mounted on and traveling with one of the drive member 32,33, serve to selectively stop the carrier in the desired position, which may be selected by the order clerk using the controls 58. The actuator 63 also may be utilized to actuate a stop switch 64 when the carrier 31 reaches the loading opening 53 at the loading station.

As also seen in FIG. 5, the discharge station may be provided with a safety bar 65 which, when elevated, will actuate one or both of the safety switches 66 to deenergize the drive motor 42 in the event the carrier 31 commences upward movement while the customer's hand is in the carrier or there is some other obstruction which would prevent free upward movement of the carrier.

Figure 6:
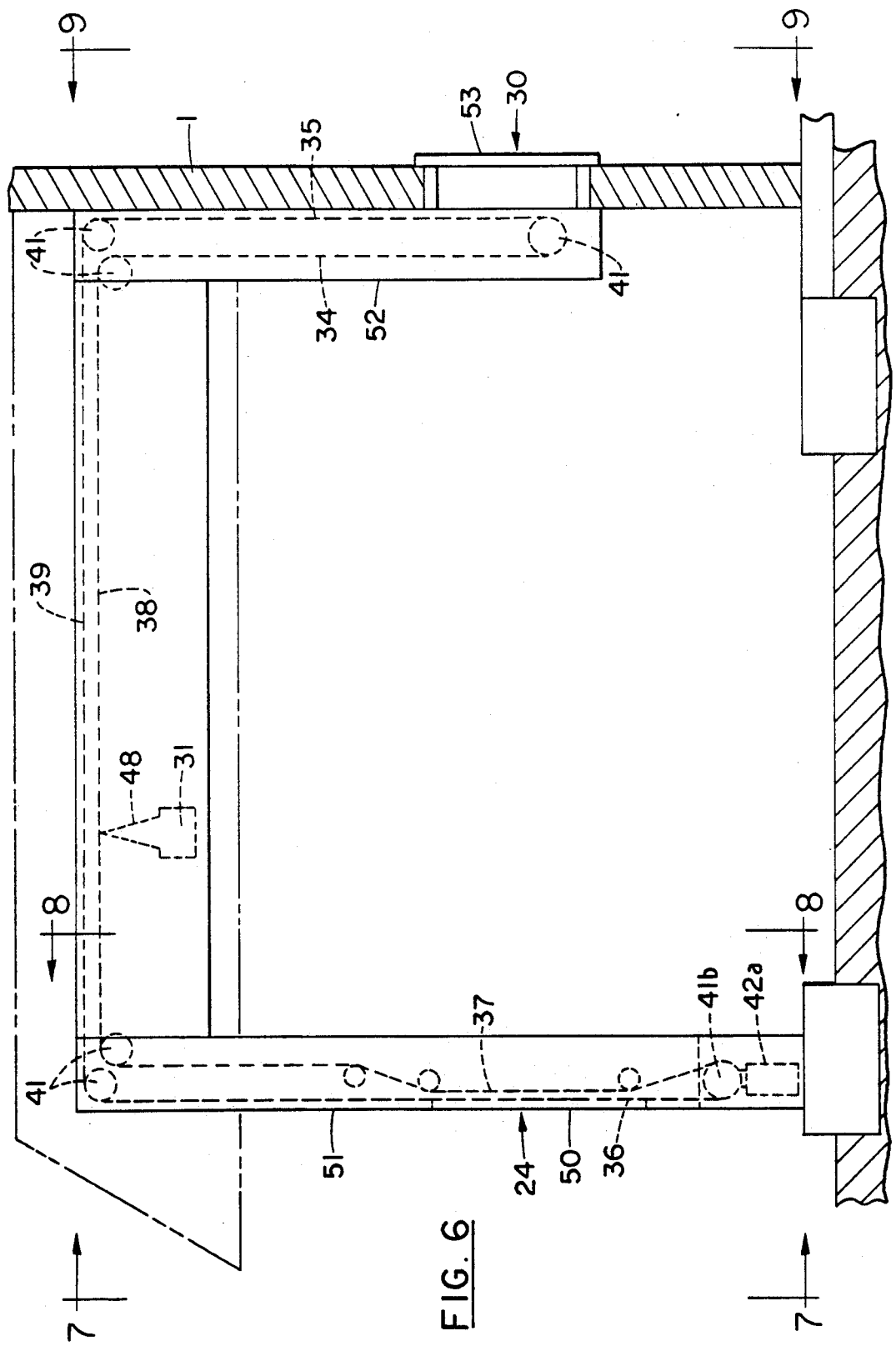
FIG. 6 is a fragmentary side elevational view with parts broken away similar to FIG. 4 illustrating a modified conveyor system.

The embodiment illustrated in FIG. 6 is similar to the embodiment illustrated in FIG. 4 except in this instance the drive motor 42a is located beneath the discharge window 50 and driven from drive sprockets 41b. It will be apparent, however, that the conveyor may be driven from any suitable location, although preferably the drive motor will be located at the delivery station to facilitate maintenance and repair without interfering with activities at the loading stations.

FIGS. 10-12 illustrate a further embodiment of the invention wherein the conveyor drive members comprise elastomeric drive tapes 67, such as Dymetrol® drive tapes manufactured by DuPont. These tapes are flexible and may be bent and twisted and also may be utilized to both push and pull. To this end, where drive tapes are utilized, sprocket wheels may be eliminated and the tapes guided by flexible plastic sheaths 68 each having a longitudinal opening 69 along one of its sides which exposes the enclosed tape. The tape is provided with a continuous series of spaced apart perforations 70, best seen in FIG. 12, adapted to be driven by a cog wheel or sprocket 71 having lugs 72 which engage the perforations 70 in the tape. In the embodiment illustrated and as seen in FIG. 12, the cog wheels 71 are driven by a reversible motor 73 acting through gear box 74 and drive shaft 75 housed at the lower end of the delivery station. If desired, the drive shaft 75 may be provided with suitable slip clutches 76 to prevent damage to the drive tapes in the event of a malfunction.

Where drive tapes are utilized, the support shaft 45a for the carrier 31 is pivotally mounted at its opposite ends to blocks 77 adapted to travel along the sheaths 68, the blocks having neck portions which project into the longitudinal openings 69 with the blocks fixedly secured to the drive tapes 67.

The tapes may be endless and follow the same paths of travel as the chain drive members 32 and 33 seen in FIG. 3. However, since the drive tapes can be either pushed or pulled, return flights are unnecessary and the arrangement shown in FIGS. 10 and 11 may be utilized, the free ends of the tapes being accumulated in storage pockets 78 lying adjacent the sheaths 68 at the discharge station. As seen in FIG. 11, the leading end of the tape, indicated at 79, extends just slightly beyond the carrier 31, whereas the trailing end of the tape, indicated at 80, lies within the storage pocket 78, as does a substantial portion of the tape since the carrier 31 is near the delivery station. When it is desired to return the carrier 31 to the loading station, the drive motor is actuated to drive the cog wheels 71 in a clockwise direction which acts to withdraw the tapes from the storage pockets 78 and push them through the sheaths 68, thereby advancing the carrier 31 toward the loading station. Sufficient tape will be stored in the pockets 78 to permit the carrier 31 to be pushed to the loading station. Preferably, the free ends 80 of the tapes will be anchored within the storage pockets to prevent accidental withdrawal.

Figure 13:
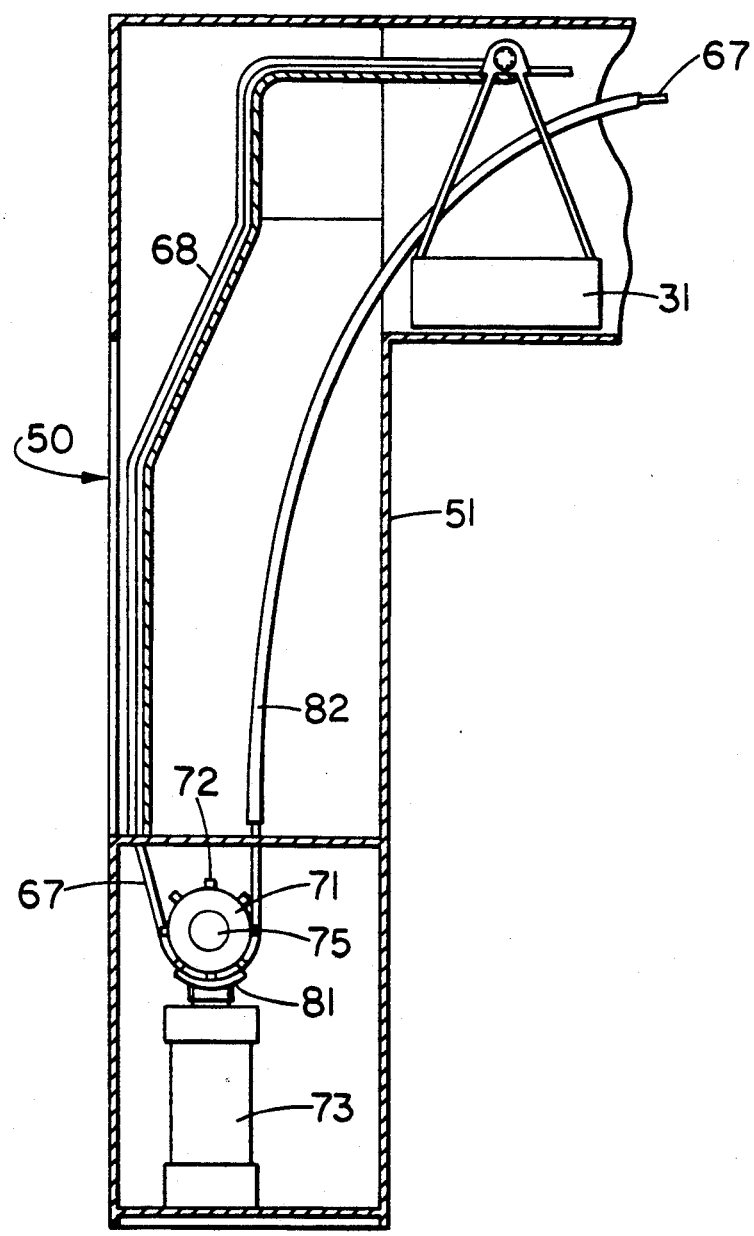
FIG. 13 is a side elevational view similar to FIG. 11 illustrating a modification wherein the tape is accumulated in storage sheaths.

In order to insure engagement of the perforations in the tape with the lugs 72 on the cog wheels 71, a curved guide on shoe 81 (seen in FIGS. 11 and 13) is provided to maintain positive contact between the drive tapes and the cog wheels. When it is desired to return the carrier to the delivery station, the motor 73 is reversed, which acts to rotate the cog wheels 71 in a counterclockwise direction, thereby pulling the tapes 67 through the sheaths 68 and depositing them in the storage pockets 78 where they collect randomly. If desired, the tapes may be wound on reels driven in synchronism with the cog wheels 71. In an alternative arrangement seen in FIG. 13, the storage pockets 78 are replaced by storage sheaths 82 which extends upwardly through the discharge station and then horizontally for a sufficient distance to receive the full lengths of the tapes when the carrier is at the discharge station.

It also has been found that the useful life of the tapes can be materially increased by spacing the lugs 72 on the cog wheels 71 at intervals such that they engage non-adjacent perforations in the tapes, i.e., every second or third perforation, rather than each perforation. When the perforations wear, the tapes may be shifted so that next adjacent perforations are engaged by the lugs, thereby effectively providing unused perforations for engagement by the cog wheels.

As should now be apparent, the present invention provides an integrated system for drive-in operations which is adaptable to a wide variety of operating conditions depending upon the extent of automation desired. In its basic form, the system comprises a product conveyor by means of which the customer's order may be processed at a central order station and delivered to the customer at a remote delivery station. In an expanded version of the system, the orders are received in the central order processing station from one or more order stations located in advance of the delivery stations, the order stations being equipped with conveyors by means of which payment for the orders may be made and change received at the order station, thereby decreasing the normal time interval between the placing of the order and the departure of the customer from the drive-through lane. As also will be apparent, the system of the present invention readily lends itself to computerization of both the ordering and payment procedures, depending upon the degree of automation desired.

What is claimed is:

1. A conveyor system for delivering items from a processing station to a remote delivery station,
    an opposing pair of spaced apart drive member,
    guide means for each of said drive members positioned to define mating paths of travel for said drive members, said corresponding paths of travel extending between said processing station and including a vertical segment at each of said stations interconnected by a horizontal segment, the vertical segments of said guide means at said delivery station including outwardly inclined segments positioned to displace the carrier laterally outwardly as it approaches the discharge station,
    reversible drive means operatively connected to said drive members for moving them in unison,
    a carrier extending between said opposing drive members in a horizontally disposed upright position, and
    means for rotatably mounting said carrier relative to said drive members, whereby said carrier will rotate relative to said drive members and remain in upright position irrespective of whether said drive members are traveling vertically or horizontally in their mating paths of travel,
    surrounding housings at the processing station and at the delivery station enclosing said guide members, an access opening in each housing, the access opening at said delivery station being of a length to define a high delivery position and a low delivery position, the outwardly inclined segments of said guide means being positioned to displace said carrier laterally outwardly as it approaches said high delivery position, said guide means including lower vertical segments positioned to move said carrier vertically between the high and low delivery positions, and
    first stop means positioned for arresting movement of said carrier in alignment with the access opening at said processing station, and second stop means positioned for selectively arresting movement of said carrier in alignment with either the high or low delivery positions at said delivery station.

2. The conveyor system claimed in claim 1 wherein said drive members comprise chains, wherein said guide means comprise sprockets engageable with said chains and wherein the means rotatably mounting said carrier relative to said drive members comprises a supporting rod rotatably connected to said chains at its opposite ends, and means suspending said carrier from said supporting rod.

3. The conveyor system claimed in claim 2 wherein said drive means comprises a reversible motor, and wherein said motor is operatively connected to a pair of drive sprockets forming a part of said guide means.

4. The conveyor system claimed in claim 1 including displaceable safety switch means at said discharge station to deenergize said drive motor.

5. The conveyor system claimed in claim 1 wherein said drive members comprise elastomeric drive tapes having perforation throughout their lengths at spaced apart intervals, wherein said guide means comprise elongated sheaths surrounding said tapes, said sheaths having longitudinal extending openings in one side thereof exposing said tapes, and wherein the means rotatably mounting said carrier relative to said drive members comprises a supporting rod rotatably connected to said tapes at its opposite ends, and means suspending said carrier from said supporting rod.

6. The conveyor system claimed in claim 5 wherein said drive means comprises a reversible motor and includes cog wheels operatively connected to said motor, said cog wheels being positioned to engage the perforations in said tapes to thereby drive said tapes.

7. The conveyor system claimed in claim 6 wherein said supporting rod is connected to said tapes in close proximity to one end thereof, and collection means at the opposite ends of said tapes to receive portions of said tapes when said tapes are driven in the direction of said last named ends.

8. The conveyor system claimed in claim 7 wherein said tape collection means comprises tape receiving pockets mounted adjacent the cog wheels.

9. The conveyor system claimed in claim 8 wherein said tape collection means comprise sheaths for the tapes.

10. In an integrated ordering and service system for drive-in restaurants and the like, a central processing station, an order station remote from said central processing station, a delivery station remote from both said central processing station and said order station, a single continuous vehicular lane extending between said order station and said delivery station, said lane being of a width to accommodate one vehicle at a time and having an entrance in advance of said order station and an exit beyond said delivery station, order selecting means at said order station operatively connected to order receiving means at said central processing station, a reversible currency conveyor extending between said order station and said central processing station, a closed currency receptacle movable between said stations by said currency conveyor, said currency conveyor including a belt-type conveyor system and said currency receptacle being of a size to transmit currency between said order station and said central processing station between the belts of said belt-type conveyor, a reversible product conveyor extending between said central processing station and said delivery station for delivering ordered items from said central processing station to said delivery station, said product conveyor including a carrier, means for moving said carrier both horizontally and vertically as it travels between said central processing station and said delivery station, and means for maintaining said carrier in upright condition while traveling both horizontally and vertically between said last named stations, whereby all transactions relating to the ordering of items and the payment for items ordered occur exclusively at said order station and the delivery of purchased items to the customer occur exclusively at said delivery station, all of said transactions being conducted by restaurant personnel located solely at said central processing station.

11. The system claimed in claim 10 wherein said order selecting and order receiving means comprise audio means.

12. The system claimed in claim 11 wherein said order selecting and order receiving means further comprise video means.

13. The system claimed in claim 12 wherein said order selecting and order receiving means further comprise computerized date storage means.

14. In an integrated ordering and service system for drive-in restaurants and the like, a central processing station, an order station remote from said central processing station, a delivery station remote from both said central processing station and said order station, a single continuous vehicular lane extending between said order station and said delivery station, said lane being of a width to accommodate one vehicle at a time and having an entrance in advance of said order station and an exit beyond said delivery station, electronic order selecting means at said order station, electronic order receiving means at said central processing station, said order receiving means including computerized data storage means, a reversible currency conveyor extending between said order station and said central processing station, a closed currency receptacle movable between said stations by said currency conveyor, said currency conveyor including a belt-type conveyor system and said currency receptacle being of a size to transmit currency between said order station and said central processing station between the belts of said belt-type conveyor, a reversible product conveyor extending between said central processing station and said delivery station for delivering ordered items from said central processing station to said delivery station, said product conveyor including a carrier, means for moving said carrier both horizontally and vertically as it travels between said central processing station and said delivery station, and pivotal suspension means for maintaining said carrier in upright condition at all times while traveling both horizontally and vertically between said last named stations, whereby all transactions relating to the ordering of items and the payment for items ordered occur exclusively at said order station and the delivery of purchased items to the customer occur exclusively at said delivery station, all of said transactions being conducted by restaurant personnel located solely at said central processing station.

15. The system claimed in either of claim 10 or 14 wherein the means for moving said carrier both horizontally and vertically comprises an opposing pair of spaced apart drive members, guide means for each of said drive members positioned to define corresponding paths of travel, and reversible drive means operatively connected to said drive members to move them in unison.

16. The system claimed in claim 15 wherein said drive members comprise chains, wherein said guide means comprise sprockets engageable with said chains, and wherein the means for maintaining the carrier in upright condition comprises a supporting rod rotatably connected to said chains at its opposite ends, and means suspending said carrier from said supporting rods.

17. The system claimed in claim 15 wherein said drive members comprise elastomeric drive tapes having perforations throughout their lengths, wherein said guide means comprise elongated sheaths surrounding said tapes, said sheaths having longitudinally extending openings in one side thereof exposing the tapes.

* * * * *